United States Patent [19]

Gallagher et al.

[11] 3,816,300

[45] June 11, 1974

[54] PLATINUM-RHENIUM HYDROCARBON CONVERSION PROCESS

[76] Inventors: James P. Gallagher; Leonard D. Krenzke, both of 400 E. Sibley Blvd., Harvey, Ill. 60426

[22] Filed: Aug. 6, 1971

[21] Appl. No.: 169,826

[52] U.S. Cl............................ 208/139, 260/683.65
[51] Int. Cl............................................. C10g 35/06
[58] Field of Search........... 208/139, 137, 138, 143; 260/683.65

[56] References Cited
UNITED STATES PATENTS

| | | | |
|---|---|---|---|
| 2,642,383 | 6/1953 | Berger et al. | 208/138 |
| 2,642,384 | 6/1953 | Cox | 260/683.65 |
| 2,838,444 | 6/1958 | Teter et al. | 208/138 |
| 2,838,445 | 6/1958 | Teter et al. | 208/138 |
| 2,841,626 | 7/1958 | Holzman et al. | 260/683.65 |
| 2,943,127 | 6/1960 | Carr | 260/683.65 |
| 3,573,199 | 3/1971 | McCoy | 208/139 |
| 3,617,522 | 11/1971 | Schrepfer | 208/139 |
| 3,661,768 | 5/1972 | Davis et al. | 208/139 |
| 3,709,817 | 1/1973 | Suggitt et al. | 208/139 |

*Primary Examiner*—Delbert E. Gantz
*Assistant Examiner*—James W. Hellwege
*Attorney, Agent, or Firm*—Frank J. Uxa

[57] ABSTRACT

Increased product yields are obtained using an alumina-platinum group metal-rhenium-halogen catalyst wherein the alumina is derived from hydrous alumina predominating in alumina trihydrate by employing a water concentration in contact with the catalyst during processing regulated within a range higher than substantially anhydrous conditions. Additional beneficial results are obtained, if, prior to processing, the catalyst is contacted with a hydrogen-containing gas containing at least about 5 mole ppm. of water vapor.

18 Claims, No Drawings

PLATINUM-RHENIUM HYDROCARBON CONVERSION PROCESS

The present invention relates to an improved process for the conversion of hydrocarbons in the presence of hydrogen. More particularly, the invention relates to an improved process for converting a hydrocarbon charge stock in the presence of hydrogen using a catalyst comprising alumina, a platinum group metal component, a rhenium component and a halogen component.

Processes involving the use of catalysts having both hydrogenation-dehydrogenation and cracking activities are widely used today in many industries, such as the petroleum and petrochemical industries, to give a wide spectrum of hydrocarbon products. The reactions which are promoted by this type of catalyst include hydrocracking, isomerization, dehydrogenation, hydrogenation, desulfurization, cyclization, alkylation, polymerization, cracking, hydroisomerization and the like. In many cases, the commercial processes using these dual-activity catalysts involve the simultaneous occurrence of more than one of these reactions. An example of this type of process is reforming, wherein a hydrocarbon feed stream comprising paraffins and naphthenes is subjected to conditions which promote dehydrogeneration of naphthenes to aromatics, dehydrocyclization of paraffins to aromatics, isomerization of paraffins and naphthenes, hydrocracking of naphthenes and paraffins and the like reactions to produce a high octane or aromatic-rich product stream. Another example of a process in which more than one reaction occurs simultaneously is hydrocracking, wherein catalysts having the dual activity noted previously are used to promote selective hydrogeneration and cracking of high molecular weight unsaturated materials, selective hydrocracking of high molecular weight materials and other like reactions to produce a generally lower boiling, more valuable product stream. Yet another example of a process utilizing these catalysts is an isomerization process, wherein, for example, a hydrocarbon fraction which is relatively rich in straight-chain paraffin components is contacted with the catalyst to produce an output stream rich in isoparaffin compounds.

Until recently, it had been preferred to use a catalyst comprising alumina and a platinum group metal component, with halogen as an optional component, to achieve the dual activity required of the catalyst. Generally, the cracking function is believed to be associated with the alumina, while the hydrogenation-dehydrogenation activity is attributed to the platinum group metal component. A recent development which provides for improved activity stability has been the incorporation of a component such as rhenium into the alumina-platinum group metal catalyst. Other components, such as germanium, tin and the rare earth metals, such as cerium, may be used in place of rhenium, although rhenium is preferred.

Whether the catalyst comprises alumina-plantinum group metal or alumina-platinum group metal-rhenium, prior art has taught the importance of utilizing the catalyst in a substantially anhydrous environment. In Republic of South Africa Patent No. 692,538 (based on U.S. Pat. Application Ser. No. 723,886) the concept of substantially anhydrous processing was carried forward to gamma alumina-platinum group metal-rhenium-halogen catalysts.

The above-noted South African patent is of special significance since it indicates that not only are the reactions which are promoted by the gamma alumina-platinum group metalrhenium-halogen catalyst advantageously carried out in a substantially anhydrous environment i.e., less than 0.02 mm Hg water vapor partial pressure in the reaction zone, but also the catalyst itself is to be prereduced in a substantially anhydrous environment, i.e., less than about 5.0 volume ppm. water in the reducing medium. Prereduction, or reduction, of the catalyst as used herein refers to the chemical reduction of the metallic components of the catalyst to lower oxidation states. For example, in the preparation of an alumina-platinum group metal-rhenium catalyst, the metallic components may be incorporated in the catalyst in the form of salts. These salts may be reduced, for example, by contacting the catalyst with hydrogen to produce highly dispersed platinum group metal and rhenium having lower oxidation states than in the original salts.

In order to show that dry prereduction of gamma aluminaplatinum group metal-rhenium-halogen catalyst gives superior performance to wet prereduction, the above-noted South African patent presents data collected from reforming a naphtha at constant conditions with both dry and wet reduced catalysts. These data indicate that a catalyst based on gamma alumina and reduced dry has higher activity (measured by the octane number of the final product) and better selectivity (measured by the amount of $C_5+$ product) than a gamma alumina catalyst reduced wet.

In order to achieve the substantially anhydrous conditions desired by the prior art, it may be necessary to provide means for drying not only the hydrocarbon charge stock to the reaction zones, but also the incoming gas streams including the fresh hydrogen gas, if any, and the recycle hydrogen gas. The driers for each of these streams are expensive and, therefore, it would be advantageous to operate a process in which the various reactions promoted by the alumina-platinum group metal-rhenium-halogen catalyst occur efficiently in an environment which is not substantially water-free.

Therefore, one of the objects of the present invention is to efficiently carry out the reactions promoted by alumina-platinum group metal-rhenium-halogen catalysts in the presence of hydrogen without using a substantially anhydrous environment. Another object of the present invention is to increase the product yield from reactions promoted by alumina-platinum group metal-rhenium-halogen catalysts in the presence of hydrogen. Other objects and advantages of the present invention will become apparent hereinafter.

It has now been discovered that increased product yields, i.e., improved catalyst selectivity, can be obtained using an alumina-platinum group metal-rhenium-halogen catalyst wherein the alumina is derived from hydrous alumina predominating in alumina trihydrate if the water concentration in contact with the catalyst during processing is maintained within a range higher than the substantially anhydrous conditions required by the prior art. Therefore, in one aspect, the present invention is a method for converting hydrocarbons in at least one reaction zone using a catalyst comprising alumina derived from hydrous alumina predominating in alumina trihydrate, a platinum group metal component, a rhenium component and a halogen component in the presence of hydrogen and water vapor which comprises:

a. contacting said solid catalyst with a hydrogen-containing gas in order to chemically reduce at least a portion, preferably a major portion, of the platinum group metal and the rhenium contained therein and thus form a reduced solid catalyst;

b. contacting said reduced solid catalyst in said reaction zone with charge hydrocarbon in the presence of hydrogen and water vapor at hydrocarbon conversion conditions to provide an environment suitable for hydrocarbon conversion, said water vapor being present in said reaction zone in a concentration expressed as partial pressure of at least 0.02 mm Hg.

While it has been found that a water vapor concentration expressed as partial pressure of at least 0.02 mm Hg. gives beneficial results relative to a substantially anhydrous reaction environment, it is preferred that the water vapor concentration in the reaction zone be at least about 0.10 mm Hg., and more preferably at least about 0.40 mm Hg., in order to receive the full and maximum benefits of the present invention. Of course, the water vapor concentration within the reaction zone is limited on the upper end of the scale for reasons of catalyst stability. For example, high water vapor concentrations during processing tend to cause sintering of the catalyst, i.e., destruction of the porous character of the alumina leading to reductions in the surface area and activity of the catalyst. An additional detriment to operating with high water vapor concentrations is the fact that the water may cause the removal of the halogen component from the catalyst. This latter problem can be alleviated by adding halogen to the charge hydrocarbon to insure a constant catalyst halogen level. In order to avoid the above-noted problems, it is preferred that the water vapor partial pressure in the reaction zone be less than about 3 mm Hg., more preferably less than about 1.5 mm Hg. Therefore, the preferred reaction zone water concentration expressed as partial pressure is from about 0.10 mm Hg. to about 3 mm Hg., more preferably from about 0.4 mm Hg. to about 1.5 mm Hg.

An additional aspect of the present invention involves the discovery that additional benefits result if the method of converting hydrocarbons is carried out as outlined above provided that in step (a) the hydrogen-containing gas includes at least about 5 mole ppm. of water vapor. The preferred water vapor concentration during step (a) is at least about 20 mole ppm., and more preferably at least about 35 mole ppm. For basically the same reasons as noted previously, the water vapor concentration during step (a) is preferably limited to less than about 150 mole ppm., more preferably less than about 50 mole ppm. of the hydrogen-containing gas. Therefore, the preferred water concentration of the hydrogen-containing gas in step (a) is from about 20 mole ppm. to about 150 mole ppm., more preferably from about 35 mole ppm. to about 50 mole ppm. Except for the above-noted water concentration, it is preferred that the hydrogen-containing gas in step (a) be substantially pure hydrogen. Because of convenience and operating efficiency it is preferred to place the solid catalyst in the reaction zone prior to reducing the catalyst by contact with a hydrogen-containing gas.

As indicated above, the catalyst utilized in the present invention comprises alumina derived from hydrous alumina predominating in alumina trihydrate, a platinum group metal component, a rhenium component and a halogen component. Considering first the alumina utilized in the present invention, it is preferred that this alumina material be a porous, adsorptive, support having a surface area of from about 25 $m^2$/gm to about 600 $m^2$/gm or more. The alumina comprises a major proportion, preferably at least about 80 percent, and more preferably at least 90%, by weight of the catalyst. The more preferred catalyst support, or base, is an alumina derived from hydrous alumina predominating in alumina trihydrate which alumina, when formed as pellets and calcined, has an apparent bulk density of from about 0.75 gm./cc to about 0.85 gm./cc, pore volume from about 0.45 ml/gm to about 0.55 ml/gm, and surface area from about 100 $m^2$/gm to about 500 $m^2$/gm. The alumina support may contain, in addition, minor proportions of other well known refractory inorganic oxides such as silica, zirconia, magnesia and the like. However, the preferred support is substantially pure alumina derived from hydrous alumina predominating in alumina trihydrate.

The alumina support may be synthetically prepared in any suitable manner and may be activated prior to use by one or more treatments including drying, calcination, steaming and the like. The alumina may be formed in any desired shape such as spheres, pills, cakes, extrudates, powers, granules and the like.

The support, i.e., alumina derived from hydrous alumina predominating in alumina trihydrate, may be prepared according to the methods disclosed in U.S. Pat. No. 2,838,444; and 2,838,445; which patents are hereby incorporated herein by reference.

The alumina base can be shaped into spheres by means of the well known oil-drop method. In the oil-drop method, drops of coaguable aqueous slurry of a mixture of dried or dried and calcined alumina and hydrous alumina are fed to a column of a water-immiscible liquid, e.g., mineral oil, carbon tetrachloride, tetrabromoethane, and the like and mixtures thereof, which can be maintained at close to ambient temperature, e.g., up to about 120°F. The column can also contain a coagulating agent which is preferably gaseous ammonia passing upwardly through the column. As the drops descend in the column, essentially firm spheroidal particles are formed. The resulting particles can be collected in the lower portion of the column, separated from the water-immiscible liquid and, if desired, aged in ammonia water, washed, dried and calcined. If the spheroidal particles are calcined, the resulting product is a hard, porous alumina gel. When the catalyst used in the present invention is to be made in the form of spheres by means of the oil drop method, it is preferred to add the additional essential components of the catalyst, i.e., platinum group metal, rhenium and halogen, after calcination of the spheroidal particles.

An essential constituent of the catalyst of the present invention is a halogen component. Although the precise chemistry of the association of the halogen component with the alumina support is not entirely known, it is customary in the art to refer to the halogen component as being combined with the alumina support, or with the other ingredients of the catalyst. This combined halogen may be fluorine, chlorine, bromine, and mixtures thereof. Of these, fluorine and, particularly, chlorine are preferred for the purposes of the present invention. The halogen may be added to the alumina support in any suitable manner, either during preparation of the support, or before or after the addition of the catalytically active metallic components. For example, at least a portion of the halogen may be added at any stage of the preparation of the support, or to the calcined catalyst support, as an aqueous solution of an acid such as hydrogen fluoride, hydrogen chloride, hydrogen bromide and the like or as a substantially anhydrous gaseous stream of these halogen-containing components. The halogen component, or a portion thereof, may be composited with alumina during the impregnation of the latter with the platinum group component and/or rhenium component; for example, through the utilization of a mixture of chloroplatinic acid and/or perrhenic acid and hydrogen chloride. In another situation, the alumina hydrosol which is typically utilized to form the alumina component may contain halogen and thus contribute at least a portion of the halogen component to the final composite. For purposes of the present invention, when the catalyst support, i.e., alumina derived from hydrous alumina predominating in alumina trihydrate, is used in the form of an extrudate, and platinum and rhenium are added before extrusion, it is preferred to add the major portion of the halogen component to the otherwise fully composited calcined catalyst by contacting this catalyst with a substantially anhydrous stream of halogen-containing gas. When the catalyst is prepared by impregnating calcined, formed alumina, for example, spheres produced by the oil drop method, it is preferred to impregnate the support simultaneously with the platinum group metal, rhenium component and halogen. In any event, the halogen will be added in such a manner as to result in a fully composited catalyst that contains from about 0.1 to about 1.5 percent and preferably from about 0.6 to about 1.3 percent by weight of halogen calculated on an elemental basis. During processing, i.e., the period during which hydrocarbon is being converted, the halogen content of the catalyst can be maintained at or restored to the desired level by the addition of halogencontaining compounds, such as carbon tetrachloride, ethyl trichloride, t-butyl chloride and the like, to the hydrocarbon charge stock before entering the reaction zone.

As indicated above, the catalyst of the present invention also contains a platinum group metal component. The platinum group metals include platinum, palladium, rhodium, ruthenium and the like with platinum being preferred for use in the present invention. The platinum group metal component, such as platinum, may exist within the final unreduced catalyst at least in part as a compound such as an oxide, sulfide, halide and the like, or in the elemental state. Generally, the amount of the platinum group metal component present in the final catalyst is small compared to the quantities of the other components combined therewith. In fact, the platinum group metal component generally comprises from about 0.05 to about 3.0 percent, preferably from about 0.05 to about 1.0 percent, by weight of the catalyst calculated on an elemental basis. Excellent results are obtained when the catalyst contains from 0.2 to about 0.9 percent by weight of the platinum group metal.

The platinum group component may be incorporated in the catalyst in any suitable manner, such as by coprecipitation or cogellation with the alumina support, ion-exchange with the alumina support and/or alumina hydrogel, or by the impregnation of the alumina support and/or alumina hydrogel at any stage in its preparation and either after or before calcination of the alumina hydrogel. The preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Other water-soluble compounds of platinum may be employed as impregnation solutions, including, for example, ammonium chloroplatinate and platinum chloride. The utilization of a platinum-chlorine compound, such as chloroplatinic acid, is preferred since it facilitates the incorporation of both the platinum component and at least a minor quantity of the halogen component. It is preferred to impregnate the support with the platinum group metal and rhenium component when it is in a hydrous state. Following this impregnation, the resulting impregnated support is shaped (e.g., extruded), dried and subjected to a high temperature calcination or oxidation procedure at a temperature in the range from about 700°F. to about 1,500°F., preferably from about 850°F. to about 1,300°F., for a period of time from about 1 hour to about 20 hours, preferably from about 1 hour to about 5 hours. The major portion of the halogen component may be added to this otherwise fully composited calcined catalyst by contacting this catalyst which a substantially anhydrous stream of halogencontaining gas.

Another essential constituent of the catalyst of the present invention is an additional component exemplified by rhenium. This component may be present as an elemental metal, as a chemical compound, such as the oxide, sulfide or halide, or in a physical or chemical association with the alumina support and/or the other components of the catalyst. Generally, the rhenium component is utilized in an amount which results in a catalyst containing from about 0.01 to about 5 percent, preferably from about 0.05 to about 1.0 percent, by weight of rhenium calculated as the elemental metal. The rhenium component may be incorporated in the catalyst in any suitable manner and at any stage in the preparation of the catalyst. The procedure for incorporating the rhenium component may involve the impregnation of the alumina support or its precursor either before, during or after the time the other components referred to above are added. The impregnation solution can in some cases be an aqueous solution of a suitable rhenium salt such as ammonium perrhenate, and the like salts or it may be an aqueous solution of perrhenic acid. In addition, aqueous solutions of rhenium halides such as the chloride may be used if desired. It is preferred to use perrhenic acid as the source of rhenium for the catalysts utilized in the present invention. In general, the rhenium component can be impregnated either prior to, simultaneously with, or after the platinum group metal component is added to the support. However, it has been found that best results are achieved when the rhenium component is impregnated simultaneously with the platinum group component. In fact, a preferred impregnation solution contains chloroplatinic acid and perrhenic acid.

The combined weight of the rhenium component plus the platinum group component in the catalytic composite may be within the range of from about 0.1 to about 8 percent by weight, preferably from about 0.2 to about 2.0 percent by weight and, more preferably, from about 0.4 to about 1.0 percent by weight, calculated on an elemental basis.

The final unreduced catalyst prepared, for example, by a method set forth above, is generally dried at a temperature of from about 200°F. to about 600°F. for a period of from about 2 to 24 hours or more and finally calcined at a temperature of about 700°F. to about 1,500°F., preferably from about 850°F. to about 1,300°F. for a period of from about 1 hour to about 20 hours and preferably from about 1 hour to about 5 hours.

The resultant calcined catalyst is subjected to reduction prior to use in the conversion of hydrocarbons. This step as previously noted is designed to insure chemical reduction of at least a portion of the metallic components.

The reducing media is contacted with the calcined catalyst at a temperature of about 800°F. to about 1,200°F. and at a pressure in the range from about 0 psig. to about 500 psig. and for a period of time of about 0.5 to 10 hours or more and in any event, for a time which is effective to chemically reduce at least a portion, preferably a major portion, of each of the metallic components, i.e., platinum group metal and rhenium component, of the catalyst. By chemical reduction is meant the lowering of oxidation states of the metallic components below the oxidation state of the metallic component in the unreduced catalyst. For example, the unreduced catalyst may contain platinum salts in which the platinum has an oxidation state which can be lowered or even reduced to elemental platinum by contacting the unreduced catalyst with hydrogen. This reduction treatment is preferably performed in situ, i.e., in the reaction zone in which it is to be used, as part of a start-up operation using fresh unreduced catalyst or regenerated (e.g., regenerated by treatment with an oxygencontaining gas stream) catalyst.

According to the present invention, a hydrocarbon charge stock, hydrogen and water vapor are contained with a catalyst of the type described above in at least one reaction zone. This contacting may be accomplished by using the catalyst in a fixed bed system, a moving bed system, a fluidized bed system, or in a batch type operation. However, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into at least one reaction zone containing a fixed bed of the catalyst type hereinabove characterized. It is understood that the reaction system may include one or more separate reaction zones with suitable means there between to insure that the desired conversion temperature is maintained at the entrance to each reactor. The reactants may be contacted with the catalyst bed in either upward, downward, or radial flow fashion. In addition, the reactants may be in the liquid phase, a mixed liquid-vapor phase, or a vapor phase when they contact the catalyst, with best results obtained in the vapor phase.

When the catalyst described herein is used in a reforming operation, the reforming system may comprise a reforming zone containing at least one fixed bed of the catalyst previously characterized. This reforming zone may be one or more separate reactors with suitable heating means there between to compensate for the net endothermic nature of the reactions that take place in each catalyst bed. The hydrocarbon feed stream that is charged to the reforming system will comprise hydrocarbon fractions containing naphthenes and paraffins that boil within the gasoline range. Typically, the hydrocarbon feed stream may comprise from about 20 to about 70 percent by weight of naphthenes and from about 25 to about 75 percent by weight of paraffins. The preferred charge stocks are those consisting essentially of naphthenes and paraffins, although in some cases aromatics and/or olefins may also be present. When aromatics are included in the hydrocarbon charge stock, these compounds comprise from about 5 to about 25 percent by weight of the total hydrocarbon charge stock. A preferred class of charge stocks includes straight run gasolines, natural gasolines, synthetic gasolines and the like. On the other hand, it is frequency advantageous to charge thermally or catalytically cracked gasolines or higher boiling fractions thereof, called heavy naphthas. Mixtures of straight run and cracked gasolines can also be used to advantage. The gasoline charge stock may be a full boiling range gasoline having an initial boiling point of from about 50° F. to about 150°F. and an end boiling point within the range of from about 325°F. to about 425°F., or may be a selected fraction thereof which generally will be a higher boiling fraction commonly referred to as a heavy naphtha — for example, a naphtha boiling in the range of about $C_7$ to about 400°F. In some cases, it is also advantageous to charge pure hydrocarbons or mixtures of hydrocarbons that have been extracted from hydrocarbon distillates — for example, a straight-chain paraffin — which are to be converted to aromatics. It is preferred that these charge stocks be treated by conventional pretreatment methods, if necessary, to remove substantially all sulfurous and nitrogenous contaminants therefrom.

In other hydrocarbon conversion embodiments, the charge stock will be of the conventional type customarily used for the particular kind of hydrocarbon conversion being effected. For example, in an isomerization embodiment the charge stock can be a paraffinic stock rich in $C_4$ to $C_8$ normal paraffins, or a normal butane-rich stock or a n-hexane-rich stock and the like. In hydrocracking embodiments, the charge stock may be a gas oil, such as heavy straight run gas oil, heavy cracked cycle oil and the like. In addition, alkylaromatics can be conveniently isomerized by using the catalyst described herein. Likewise, pure or substantially pure, hydrocarbons can be converted to more valuable products by using the catalyst of the present invention in any of the hydrocarbon conversion processes which are promoted by a dual-function catalyst.

In order to maintain the water vapor concentration in the reaction zone at the desired level, water or water-forming compounds can be added to the hydrocarbon charge stock prior to it being passed into the reaction zone. Of course, the water can be added to the reaction zone as a separate stream or it can be added along with one or more of the gaseous streams to the reaction zone.

In a reforming operation, an effluent stream is withdrawn from the reforming zone and passed through a condensing means to a separation zone, typically maintained at about 100°F. wherein a hydrogen-rich gas is separated from a high octane liquid product, commonly designated as a reformate. The resultant hydrogen stream is then recycled by suitable compressor means back to the reforming zone. The liquid phase from the separation zone is commonly treated in a fractionating system to adjust its butane concentration and thus control the volatility of the resulting reformate.

The conditions utilized in the numerous other hydrocarbon conversion operations within the scope of the present invention are those customarily used for the particular reaction, or combination of reactions, that is to be effected. For instance alkylaromatic hydrocarbon isomerization conditions include: a temperature of about 32°F. to about 100°F.; a pressure of from 0 psig. to about 1,500psig.; hydrogen-to-hydrocarbon mole ratio of from about 0.1:1 to about 20:1, and a weight hourly space velocity (WHSV) (calculated as weight of the hydrocarbon charge stock contacted with the catalyst per hour divided by the weight of the catalyst) of from about 0.5 to 20. Likewise, hydrocracking conditions include: a pressure of from about 500 psig. to about 3000 psig.; a temperature of from about 400°F. to about 900°F.; a WHSV of from about 0.1 to about 10; and a hydrogen circulation rate of from about 1,000 to about 10,000 cubic feet per barrel of hydrocarbon charge stock.

In the reforming embodiment of the present invention, the pressure utilized is selected in the range of from about 50 psig. to about 1,000 psig., with the preferred pressure being from about 100 psig. to about 600 psig. Reforming operations may be conducted at the more preferred pressure range of from about 200 psig. to about 400 psig. to achieve substantially increased catalyst life before regeneration.

For optimum reforming results, the temperature in the reaction zone should preferably be within the range of from about 700°F. to about 1,100°F. more preferably in the range of from about 800°F. to about 1,050°F. The initial selection of the temperature within this broad range is made primarily as a function of the desired octane of the product reformate, considering the characteristics of the charge stock and of the catalyst. The temperature may then be slowly increased during the run to compensate for the inevitable deactivation that occurs, to provide a constant octane product.

In accordance with the reforming process of the present invention sufficient hydrogen is supplied to provide from about 2.0 to about 20 moles of hydrogen per mole of hydrocarbon entering the reaction zone, with excellent results being obtained when from about 7 to about 10 moles of hydrogen are supplied per mole of hydrocarbon charge stock. Likewise, the weight hourly space velocity, i.e., WHSV, used in reforming may be in the range from about 0.5 to about 10.0 with a value in the range from about 2.0 to about 5.0 being preferred.

The following examples illustrate more clearly the method of the present invention. However, these illustrations are not to be interpreted as specific limitations on this invention.

EXAMPLES 1 to 7

These examples demonstrate that the activity of an alumina-platinum group metal-rhenium-halogen catalyst based on alumina derived from hydrous alumina predominating in trihydrate remains constant with increasing water concentration in the reactor zone.

A catalyst was prepared as follows. The alumina base, derived from hydrous alumina predominating in alumina trihydrate, was made in a manner similar to that given in U.S. Pat. No. 2,838,444 by mixing aqueous $AlCl_3$ and aqueous $NH_4OH$ at a controlled pH of about 8 to precipitate the hydrate. The hydrate was filtered from the mother liquor and given several washes (filtrations at a pH of about 9) with deionized water so that the resulting hydrate product contained about 0.01 percent of chlorine. This hydrate product was reslurried in deionized water and agaed until the aluminum oxide was divided approximately as follows: 15 percent by weight of gibbsite, 35 percent by weight of Bayerite, 25 percent by weight of nordstrandite and 25 percent by weight of boehmite.

A solution of deionized water, chloroplatinic acid and perrhenic acid (containing sufficient platinum and rhenium to yield a final calcined unreduced catalyst containing 0.32 percent by weight of platinum and 0.35 percent by weight of rhenium) was added, with stirring, to the aged slurry. While stirrring continued, $NH_4 OH$ was added to the mixture to raise the pH to about 8. The mixture was dried on a drum drier heated with steam.

The drum dried material was mixed with deionized water (approximately 3 grams of dried material per gram of water) in a planetary-type dough beater for 10 minutes. The resulting mixture was forced through a one-sixteenth inch die by means of a Welding Engineer's twin screw extruder. The resulting strands were broken to yield a fraction between one-sixteenth inch and five thirty-seconds inch in length. This extrudate was dried at about 230°F. and then heated in a vertical calciner at about 900°F. for about 3 hours. The calcined material was placed in a vacuum vessel, pumped essentially free of air, and brought into contact with dry gaseous HCl in an amount sufficient to raise the chlorine content of the resulting unreduced catalyst to 1.03 percent by weight. As noted previously, this unreduced catalyst contained 0.32 percent by weight of platinum and 0.35 percent by weight of rhenium. The surface area of this catalyst was determined to be 512 $m^2/gm$.

A sample of this catalyst was placed in a reactor and was prereduced by contacting the catalyst with flowing hydrogen for 48 hours at 935°F. and atomspheric pressure. The hydrogen, which was used once-through the reactor, was essentially waterfree, containing less than about 3 mole ppm. water.

After this pretreatment, the catalyst was ready for hydrocarbon processing. To control the amount of water being fed to the reactor, a measured amount of water vapor was added to the hydrogen gas to the reactor and the hydrocarbon charge stock was passed over mole sieves in order to remove water. To insure that the hydrocarbon charge stock was substantially waterfree, it was passed over a platinum-alumina catalyst to convert the oxygen and oxygen-containing components to water which was then removed by the mole sieve. The tests in this series of runs were made using hydrocarbon charge stock of the following composition:

| | |
|---|---|
| API Gravity | 55.6 |

|  | -Continued |
|---|---|
| Molecular Wt. | 117.8 |
| % Paraffins | 48.3 |
| % Naphthenes | 43.1 |
| % Aromatics | 8.6 |
| % Carbon | 85.32 |
| % Hydrogen | 14.68 |
| RONC | 46.2 |
| Fisher Water, ppm. | 95 |
| Nitrogen, ppm. | 1.4 |
| Sulfur, ppm. | 70 |

| ASTM DIST. | °F. |
|---|---|
| IBP | 150 |
| 5 | 236 |
| 10 | 242 |
| 20 | 248 |
| 30 | 258 |
| 40 | 267 |
| 50 | 279 |
| 60 | 290 |
| 70 | 305 |
| 80 | 323 |
| 90 | 343 |
| 95 | 356 |
| EP | 375 |

Except for the difference in water partial pressure and temperature, all tests were run at the following conditions:

| WHSV | 2.0 |
|---|---|
| Total Pressure | 450 psig. |
| Hydrogen/Hydrocarbon Mole Ratio | 7.0 |

The hydrocarbon products from each of the tests were collected and debutanized. The octane number (research method) of the $C_5+$ product was determined and this number was used to determine the activity variation of the catalyst with water partial pressure. Using the above-described catalyst, two tests were run at 920°F. and gave the following results:

|  | Water Partial Pressure, mm. Hg. | Research Octane Number Clear |
|---|---|---|
| Example 1 | 0.072 | 94.3 |
| Example 2 | 0.72 | 94.2 |

An additional five tests were run with this catalyst at a temperature of 935°F. and gave the following results:

|  | Water Partial Pressure, mm. Hg. | Research Octane Number Clear |
|---|---|---|
| Example 3 | 0.072 | 98.2 |
| Example 4 | 0.22 | 97.9 |
| Example 5 | 0.31 | 97.9 |
| Example 6 | 0.48 | 97.5 |
| Example 7 | 0.67 | 97.2 |

These result demonstrate that the activity of a catalyst comprising alumina derived from hydrous alumina predominating in alumina trihydrate-platinum-rhenium-halogen is substantially maintained as the water concentration within the reaction zone is varied.

EXAMPLE 8 to 14

These examples demonstrate the enhanced selectivity of a catalyst comprising alumina derived from hydrous alumina predominating in alumina trihydrate-plantium group metal-rhenium-halogen with increasing water concentration in the reaction zone. In this instance, catalyst selectivity is measured by the amount of $C_5+$ product produced at a given octane number. The results used to illustrate this feature of the present invention are from the same series of tests which were described in Examples 1 to 7. The additional results are as follows:

| Example | Temp. °F. | Water PP | Octane No. | $C_5+$ Yield, Vol.% |
|---|---|---|---|---|
| 8 | 920 | 0.072 | 94.3 | 71.6 |
| 9 | 920 | 0.72 | 94.2 | 76.2 |
| 10 | 935 | 0.072 | 98.2 | 65.6 |
| 11 | 935 | 0.22 | 97.9 | 69.9 |
| 12 | 935 | 0.31 | 97.9 | 71.4 |
| 13 | 935 | 0.48 | 97.5 | 73.6 |
| 14 | 935 | 0.67 | 97.2 | 74.2 |

These results clearly indicate that while the catalyst activity is insensitive to water concentration, the catalyst selectivity increases significantly with increasing water concentration in the reaction zone.

EXAMPLES 15 to 18

The following series of examples demonstrate the additional substantial advantages obtained by reducing a catalyst comprising alumina derived from hydrous alumina predominating in alumina trihydrate-platinum group metal-rhenium-halogen in wet hydrogen. These examples were run in a manner similar to Example 1, except that the hydrogen used to reduce the catalyst in Examples 16 and 18 contained 30 ppm. of water vapor. The processing conditions were similar to those in Example 1, except that the temperature was varied to achieve a 91.5 RON $C_5+$ product and the water vapor concentration during processing was varied as indicated below.

| Example | Type of Reduction | Water-Vapor Concentration, mm. Hg. | $C_5+$ Yield, Vol.% |
|---|---|---|---|
| 15 | Dry | .29 | 78.2 |
| 16 | Wet | .29 | 81.8 |
| 17 | Dry | .36 | 78.7 |
| 18 | Wet | .36 | 81.0 |

EXAMPLES 19 and 20

The following examples demonstrate that the catalyst selectivity benefits of the present invention accrue regardless of the sulfur content of the hydrocarbon charge stock. These examples were run using a catalyst similar to that used in Example 1 and which have been reduced in wet hydrogen, i.e., 30 ppm. water, at 905°F. and atmospheric pressure for 24 hours. The charge stock used contained only 1 ppm. sulfur and had the following analysis:

| API Gravity | 56.1 |
|---|---|
| Molecular Weight | 118 |
| % Paraffins | 47.7 |
| % Naphthenes | 42.8 |
| % Aromatics | 9.5 |
| % Carbon | 85.46 |
| % Hydrogen | 14.54 |
| RONC | 50.0 |
| Nitrogen, ppm. | 1.0 |
| Sulfur, ppm. | 1.0 |

-Continued

| ASTM DIST. | °F. |
|---|---|
| IBP | 189 |
| 5 | 230 |
| 10 | 238 |
| 20 | 244 |
| 30 | 250 |
| 40 | 255 |
| 50 | 264 |
| 60 | 272 |
| 70 | 283 |
| 80 | 295 |
| 90 | 314 |
| 95 | 326 |
| EP | 342 |

Processing conditions for these two tests were as follows:

| Temperature | 905°F. |
|---|---|
| Total Pressure | 450 psig. |
| Hydrogen/Hydrocarbon Mole Ratio | 7.0 |
| WHSV | 1.98 |

Results of these two tests were as follows:

| Example | Water Partial Pressure | RONC | $C_5+$ Yield |
|---|---|---|---|
| 19 | 0.072 | 93.0 | 77.2 Vol. % |
| 20 | 0.288 | 93.1 | 79.8 Vol. % |

The embodiments of the invention in which an exclusive property or privilege is claimed are defined as follows:

1. A method for converting hydrocarbons in at least one reaction zone using a solid catalyst which comprises (a) contacting said solid catalyst comprising a major proportion of alumina derived from hydrous alumina predominating in alumina trihydrate, from about 0.05 to about 3.0 percent by weight of a platinum group metal component, from about 0.01 to about 5.0 percent by weight of a rhenium component and from about 0.1 to about 1.5 percent by weight of a halogen component with a hydrogen-containing gas in order to chemically reduce at least a portion of both the platinum group metal and the rhenium thereby forming a reduced solid catalyst and (b) contacting said reduced solid catalyst in said reaction zone with said hydrocarbon in the present of hydrogen and a hydrocarbon product yield improving amount of water vapor at hydrocarbon conversion conditions, said water vapor being present in said reaction zone for substantially the entire duration of said conversion in a concentration expressed as partial pressure of at least 0.02 mm.Hg.

2. The method of claim 1 wherein said platinum group metal comprises from about 0.05 to about 1.0 percent by weight of said solid catalyst, said rhenium component comprises from about 0.05 to about 1.0 percent by weight of said solid catalyst, and said water vapor is present in said reaction zone in a concentration expressed as partial pressure of from about 0.10 mm.Hg to about 3 mm.Hg.

3. The method of claim 2 wherein said water vapor is present in said reaction zone in a concentration expressed as partial pressure of from about 0.4 mm.Hg to about 1.5 mm.Hg.

4. The method of claim 3 wherein said platinum group metal is platinum, said rhenium component is rhenium and said halogen component is selected from the group consisting of fluorine and chlorine.

5. The method of claim 1 wherein the hydrogen-containing gas in step (a) includes at least about 5 mole ppm. of water vapor.

6. The method of claim 2 wherein the hydrogen-containing gas of step (a) includes at least about 20 mole ppm. of water vapor.

7. The method of claim 2 wherein the hydrogencontaining gas of step (a) includes from about 20 mole ppm. to about 150 mole ppm. of water vapor.

8. The method of claim 4 wherein the hydrogencontaining gas of step (a) includes from about 20 mole ppm. to about 150 mole ppm. of water vapor.

9. The method of claim 3 wherein the hydrogen-containing gas of step (a) includes from about 35 mole ppm. to about 50 mole ppm. of water vapor.

10. The method of claim 4 wherein the hydrogen-containing gas of step (a) includes from about 35 mole ppm. to about 50 mole ppm. of water vapor.

11. A method for reforming a hydrocarbon feedstock comprising paraffins and naphthenes in at least one reaction zone using a solid catalyst which comprises (a) contacting said solid catalyst comprising a major proportion of alumina derived from hydrous alumina predominating in alumina trihydrate, from about 0.05 to about 3.0 percent by weight of a platinum group metal component, from about 0.01 to about 5.0 percent by weight of a rhenium component and from about 0.1 to about 1.5 percent by weight of a halogen component with a hydrogen-containing gas in order to chemically reduce at least a portion of both the platinum group metal and the rhenium thereby forming a reduced solid catalyst and (b) contacting said reduced solid catalyst in said reaction zone with said hydrocarbon feedstock in the presence of hydrogen and a hydrocarbon product yield improving amount of water vapor at hydrocarbon reforming conditions, said water vapor being present in said reaction zone for substantially the entire duration of said reforming in a concentration expressed as partial pressure at least 0.02 mm.Hg.

12. The method of claim 11 wherein said water vapor is present in said reaction zone in a concentration expressed as partial pressure of from about 0.1 mm.Hg. to about 3 mm.Hg.

13. The method of claim 12 wherein said platinum group metal is platinum and is present in an amount from about 0.05 to about 1.0 percent by weight of said solid catalyst, said rhenium component is rhenium and is present in an amount from about 0.05 to about 1.0 percent by weight of said solid catalyst, and said halogen component is chlorine.

14. The method of claim 13 wherein said water vapor is present in said reaction zone in a concentration expressed as partial pressure of from about 0.4 mm.Hg to about 1.5 mm.Hg.

15. The method of claim 11 wherein the hydrogen-containing gas in step (a) includes at least about 5 mole ppm. of water vapor.

16. The method of claim 12 wherein the hydrogen-containing gas of step (a) includes at least about 20 mole ppm. of water vapor.

17. The method of claim 13 wherein the hydrogen-containing gas of step (a) includes from about 20 mole ppm. to about 150 mole ppm. of water vapor.

18. The method of claim 13 wherein the hydrogen-containing gas of step (a) includes from about 35 mole ppm. to about 50 mole ppm. of water vapor.

* * * * *

PO-1050
(5/69)

UNITED STATES PATENT OFFICE
CERTIFICATE OF CORRECTION

Patent No. 3,816,300      Dated June 11, 1974

Inventor(s) James P. Gallagher and Leonard D. Krenzke

It is certified that error appears in the above-identified patent and that said Letters Patent are hereby corrected as shown below:

> On the Title Page after the inventor designation insert ---Assignee: Atlantic Richfield Company, New York, New York
>
> Signed and sealed this 13th day of May 1975.

(SEAL)
Attest:

RUTH C. MASON
Attesting Officer

C. MARSHALL DANN
Commissioner of Patents
and Trademarks